(12) United States Patent
Swift et al.

(10) Patent No.: US 11,563,296 B2
(45) Date of Patent: Jan. 24, 2023

(54) TRACK BUSWAY POWER DISTRIBUTION UNIT

(71) Applicant: Server Technology, Inc., Reno, NV (US)

(72) Inventors: Mark Swift, Butler, PA (US); Darrell Kochanski, Pittsburgh, PA (US); Calvin Nicholson, Reno, NV (US)

(73) Assignee: Server Technology, Inc., Reno, NV (US)

( * ) Notice: Subject to any disclaimer, the term of this patent is extended or adjusted under 35 U.S.C. 154(b) by 32 days.

(21) Appl. No.: 17/062,389

(22) Filed: Oct. 2, 2020

(65) Prior Publication Data

US 2022/0109274 A1    Apr. 7, 2022

(51) Int. Cl.
 *H01R 25/16* (2006.01)
 *H02G 5/04* (2006.01)

(52) U.S. Cl.
 CPC .............. *H01R 25/165* (2013.01); *H02G 5/04* (2013.01)

(58) Field of Classification Search
 CPC .... H01R 33/94; H01R 25/006; H01R 13/447; H01R 25/165; H02G 5/04
 See application file for complete search history.

(56) References Cited

U.S. PATENT DOCUMENTS

| | | | |
|---|---|---|---|
| 7,043,543 B2 | 5/2006 | Ewing et al. | |
| 7,990,689 B2 | 8/2011 | Ewing et al. | |
| 8,033,867 B1 * | 10/2011 | Kessler | H01R 25/14 |
| | | | 439/652 |
| 8,321,163 B2 | 11/2012 | Ewing et al. | |
| 8,494,661 B2 | 7/2013 | Ewing et al. | |
| 8,587,950 B2 | 11/2013 | Ewing et al. | |
| 9,379,502 B2 | 6/2016 | Davidson, Jr. et al. | |
| 9,484,692 B2 * | 11/2016 | Irons | H05K 7/1492 |
| 9,583,902 B2 | 2/2017 | Irons et al. | |
| 9,614,335 B2 | 4/2017 | Irons | |
| 9,898,026 B2 | 2/2018 | Ewing et al. | |

(Continued)

FOREIGN PATENT DOCUMENTS

| | | |
|---|---|---|
| DE | 202016101189 U1 | 3/2016 |
| KR | 101389261 B1 | 4/2014 |

OTHER PUBLICATIONS

International Search Report and Written Opinion of International Application No. PCT/US2021/052993; dated Jan. 21, 2022; 9 pages.

*Primary Examiner* — Jean F Duverne
(74) *Attorney, Agent, or Firm* — Perkins Coie LLP

(57) ABSTRACT

A track busway power distribution unit including a housing, a power input coupled with the housing and connectable to an electrical busway, a securement mechanism moveably coupled to the housing and structured to secure the power distribution unit to the electrical busway, and at least one outlet module located at least partially within the housing. The outlet module can include at least one outlet core having a core outer surface configured to mate within a first connector type. The outlet core can include a plurality of electrical terminals each coupled to the power input and configured to connect with mating terminals corresponding to both the first connector type and a second connector type that is different than the first connector type. A removable shroud can be positioned around the outlet core, wherein the shroud includes a shroud inner surface configured to receive the first connector type.

20 Claims, 19 Drawing Sheets

(56) References Cited

U.S. PATENT DOCUMENTS

| | | |
|---|---|---|
| 10,236,648 B2 | 3/2019 | Irons et al. |
| 10,541,501 B2* | 1/2020 | Hutchison ............ H01R 25/006 |
| 10,680,398 B1* | 6/2020 | Irons ...................... H01R 33/94 |
| 2005/0101193 A1* | 5/2005 | Godard .............. H01R 13/6683 |
| | | 439/652 |
| 2010/0117453 A1* | 5/2010 | Langgood ............ H01R 13/447 |
| | | 307/75 |
| 2016/0372879 A1 | 12/2016 | Jur |
| 2016/0372909 A1 | 12/2016 | Baldwin et al. |
| 2019/0288470 A1 | 9/2019 | Irons et al. |
| 2020/0083656 A1 | 3/2020 | Deore et al. |

* cited by examiner

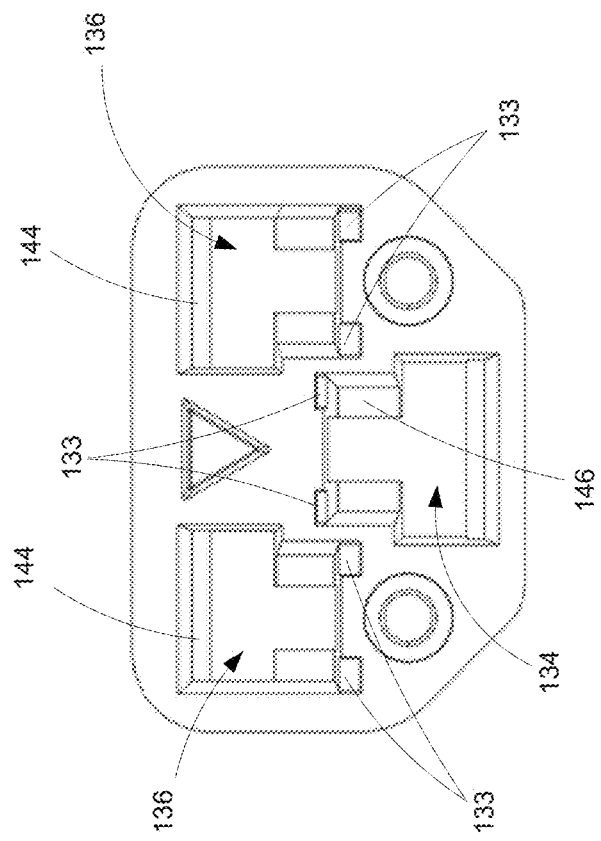
*FIG. 6A*    *FIG. 6B*

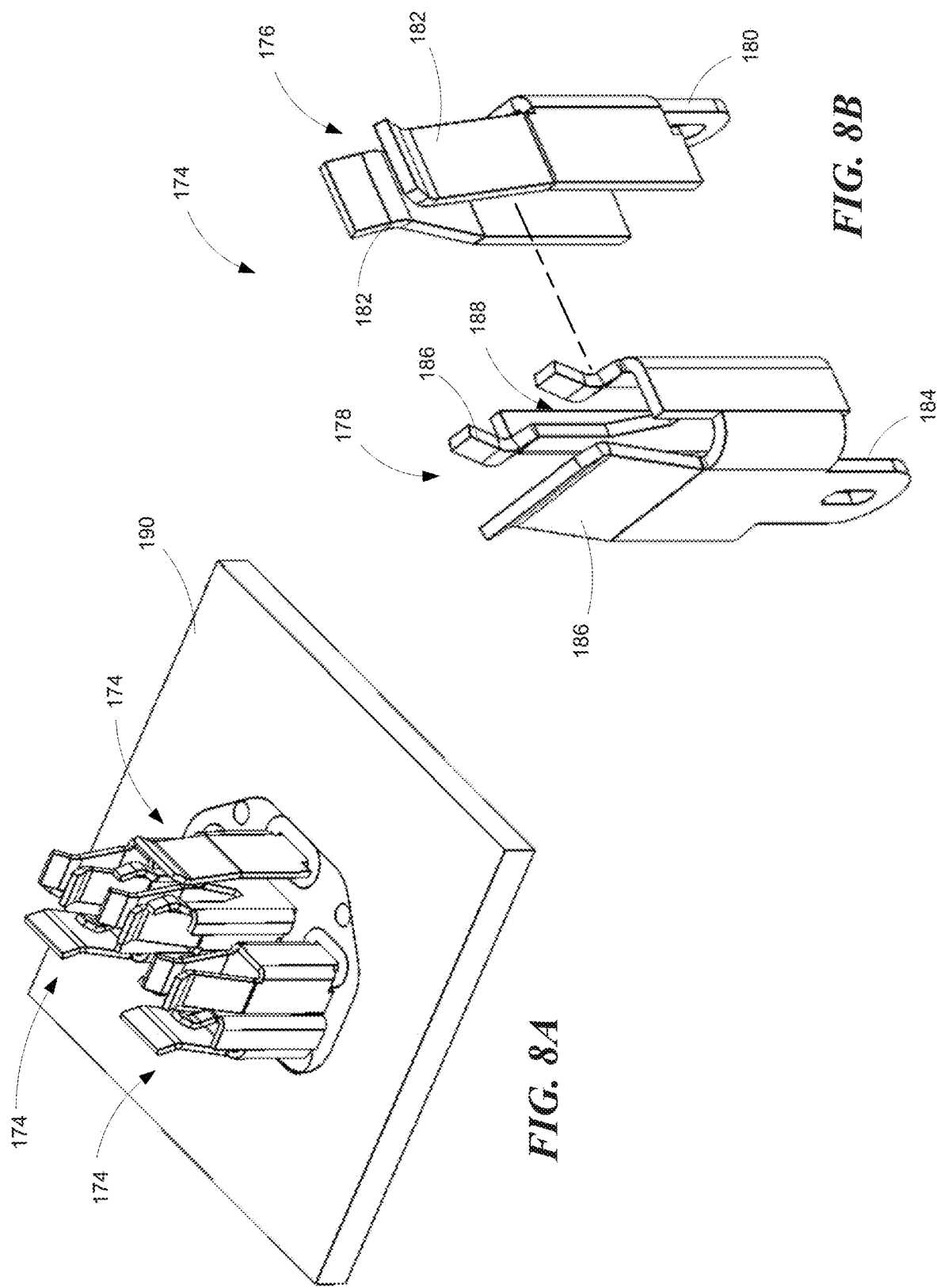

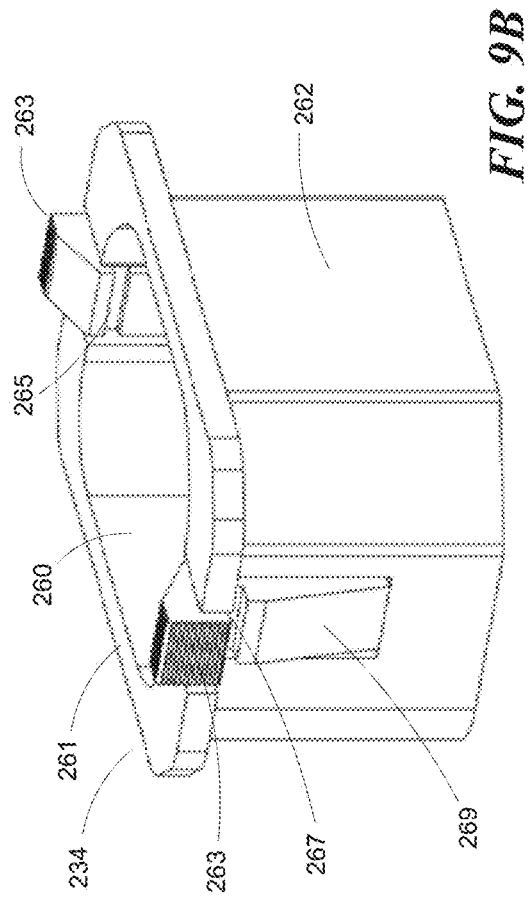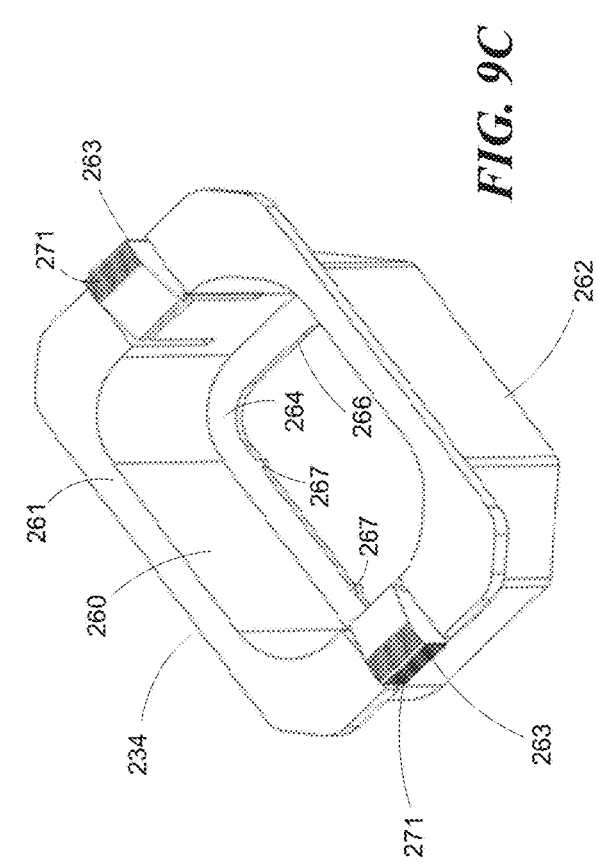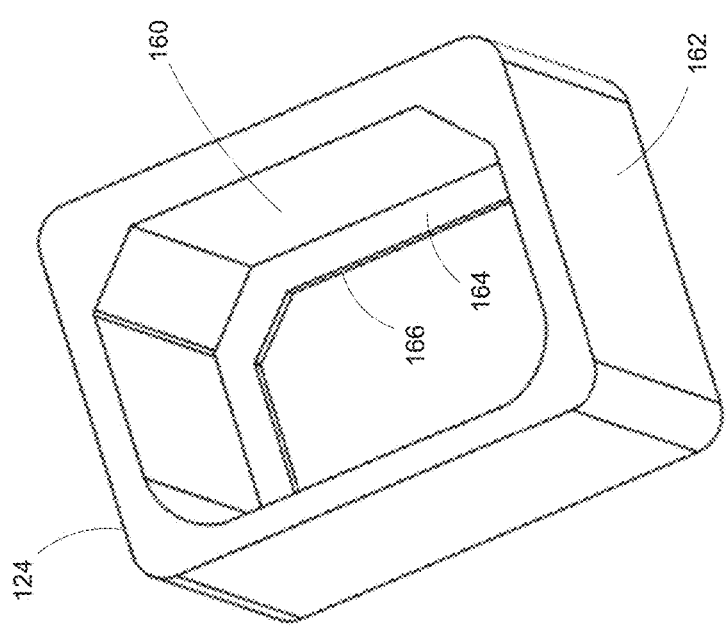

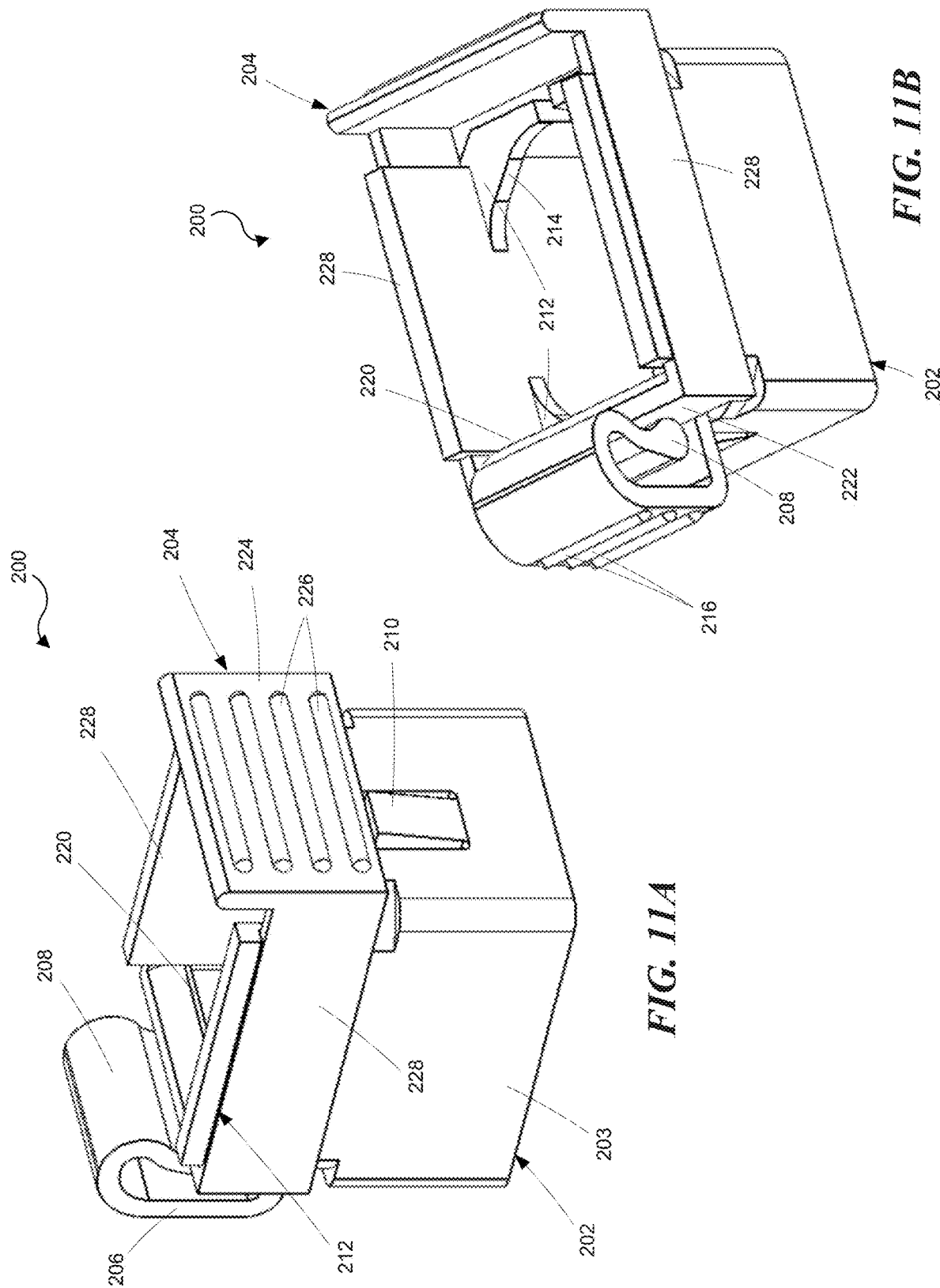

TRACK BUSWAY POWER DISTRIBUTION UNIT

TECHNICAL FIELD

The present disclosure is directed to power distribution units and, more specifically, to combination outlets and power distribution units incorporating those outlets.

BACKGROUND

A conventional power distribution unit (PDU) is an assembly of electrical outlets (also called receptacles) that receive electrical power from a source and distribute the electrical power to one or more separate electronic appliances. Each such PDU assembly has a power input that receives power from a power source, and power outlets that may be used to provide power to one or more electronic appliances. PDUs are used in many applications and settings such as, for example, in or on electronic equipment racks.

A common use of PDUs is supplying operating power for electrical equipment in computing facilities, such as enterprise data centers, multi-tenant hosting environments like colocation facilities, cloud computing, and other data center types. Such computing facilities may include electronic equipment racks that comprise rectangular or box-shaped housings sometimes referred to as a cabinet or a rack and associated components for mounting equipment, associated communications cables, and associated power distribution cables. Electronic equipment may be mounted in such racks so that the various electronic devices (e.g., network switches, routers, servers and the like) are mounted vertically, one on top of the other, in the rack. One or more PDUs may be used to provide power to the electronic equipment. Multiple racks may be oriented side-by-side, with each containing numerous electronic components and having substantial quantities of associated component wiring located both within and outside of the area occupied by the racks. Such racks commonly support equipment that is used in a computing network for an enterprise, referred to as an enterprise network.

Various different equipment racks may have different configurations, including different locations of and different densities of equipment within the racks. Equipment in modern data center racks, most commonly servers, storage, and networking devices, typically have C14 or C20 plugs, requiring C13 or C19 outlets on a corresponding rack's PDU. There is often a mixture of how many and where on the PDU each C13 or C19 outlet is positioned in order to best match the equipment. PDU equipment suppliers commonly manufacture many variations of PDU's that have different mixes of C13 and C19 outlet configurations to meet the demands of the data center market. It is also common for the servers, storage, and network equipment to be changed every three to five years, which then may require a different outlet configuration on the PDU.

SUMMARY

Combination outlet connectors and track busway PDUs incorporating those connectors are disclosed herein. In a representative embodiment, a track busway power distribution unit can include a housing, a power input coupled with the housing and connectable to an electrical busway, a securement mechanism moveably coupled to the housing and structured to secure the power distribution unit to the electrical busway, and at least one outlet module located at least partially within the housing. The outlet module can include at least one outlet core having a core outer surface configured to mate within a first connector type. The outlet core can include a plurality of electrical terminals each coupled to the power input and configured to connect with mating terminals corresponding to both the first connector type and a second connector type that is different than the first connector type. A removable shroud can be positioned around the outlet core, wherein the shroud includes a shroud inner surface configured to receive the first connector type. In some embodiments, the track busway power distribution unit can include a breaker for the unit and/or breakers for each outlet.

In another representative embodiment, a track busway power distribution unit can include a housing, a power input coupled with the housing and connectable to an electrical busway, a securement mechanism moveably coupled to the housing and structured to secure the power distribution unit to the electrical busway, and at least one outlet module located at least partially within the housing. The outlet module can include a plurality of outlet cores, each having a core outer surface configured to mate within a first connector type, there being an unobstructed space between at least two adjacent outlet cores. In some embodiments, at least one of the plurality of outlet cores includes a plurality of electrical terminals each coupled to the power input and configured to connect with mating terminals corresponding to both the first connector type and a second connector type that is different than the first connector type. In some embodiments, the unit can further comprise a removable shroud positioned around said at least one of the plurality of outlet cores, wherein the shroud includes a shroud inner surface configured to receive the first connector type.

In a representative embodiment, the combination outlet connector can include an outlet core having an input side and an output side with a plurality of (e.g., three) T-shaped apertures extending therebetween. The outlet core has a core outer surface configured to mate with a first connector type, such as a C14 connector. A plurality of electrical terminals are each positioned in a corresponding one of the apertures. A removable adapter sleeve can be positioned around the outlet core. The adapter sleeve has a sleeve outer surface configured to mate with a second connector type, such as a C20 connector. In some embodiments, the adapter sleeve includes a sleeve aperture at least partially congruent with the core outer surface. In other words, the adapter sleeve aperture is generally the same size and shape as the core outer surface. The plurality of electrical terminals are each configured to connect with mating terminals corresponding to both the first connector type and the second connector type.

As an alternative to the adapter sleeve, a removable shroud can be used when the outlet core is connected to the first type of connector. The removable shroud can be positioned around the outlet core and has a shroud inner surface configured to receive the first connector type, e.g., a C14 connector. In some embodiments, the shroud includes a shroud flange having a shroud aperture at least partially congruent with the core outer surface.

In an embodiment, the outlet core is in the form of a C13 receptacle that accepts both C14 and C20 plugs. The receptacle incorporates the slots and electrical contacts of a standard C13 as well as a standard C19 connector. In other words, the outlet core has the envelope of a C13, but accepts both C14 and C20 plugs. By incorporating the disclosed combination outlets, e.g., C13/C19, in a PDU, the number of PDU variants needed to meet the demand of the data center market can be greatly reduced. A user of a PDU with combination outlets has greater flexibility in choosing equipment and changing equipment. In addition, the user may have multiple rack configurations within the data center, each having unique PDU requirements, where this one PDU would fill all those requirements. This also greatly simplifies the requirements for stocking of spares for repair and incremental expansion.

The foregoing has outlined rather broadly the features and technical advantages of examples according to the disclosure in order that the detailed description that follows may be better understood. Additional features and advantages will be described hereinafter. The concepts and specific examples disclosed herein may be readily used as a basis for modifying or designing other structures for carrying out the same or similar purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label.

FIG. 6A is a bottom plan view of the combination outlet core shown in FIGS. 4 and 5 illustrating the configuration of the terminal apertures;

FIG. 6B is an isometric view of the combination outlet core shown in FIG. 6A illustrating the position of the electrical terminals;

FIG. 8A is an isometric view of electrical terminals according to another representative embodiment;

FIG. 8B is an exploded isometric view of an electrical terminal shown in FIG. 8A;

FIG. 9A is an isometric view of an outlet shroud according to a representative embodiment;

FIG. 9B is an isometric view of an outlet shroud according to another representative embodiment;

FIG. 9C is an isometric view of the outlet shroud shown in FIG. 9B as viewed from the top;

FIG. 11A is an isometric view of an outlet shroud assembly that locks onto a C14 plug according to a representative embodiment as viewed from the front;

FIG. 11B is an isometric view of the locking outlet shroud assembly shown in FIG. 11A as viewed from above;

DETAILED DESCRIPTION

This description provides examples, and is not intended to unnecessarily limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, and/or add various procedures or components as appropriate. For instance, aspects and elements described with respect to certain embodiments may be combined in various other embodiments. It should also be appreciated that the following systems, devices, and components may individually or collectively be components of a larger system, wherein other procedures may take precedence over or otherwise modify their application.

Figure 1:
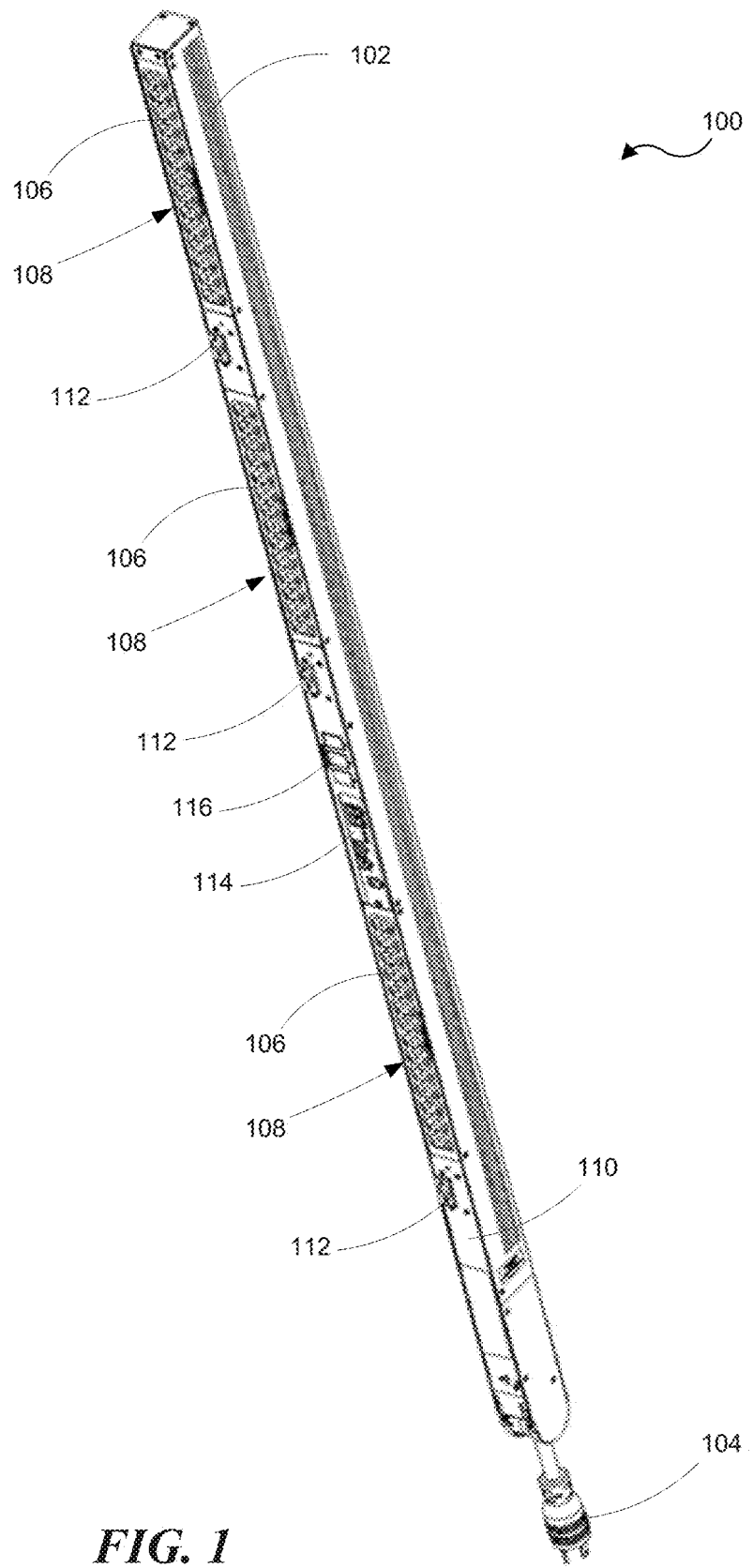
FIG. 1 is an illustration of a power distribution unit incorporating combination outlets in accordance with an embodiment of the disclosed technology.

FIG. 1 is an illustration of a representative PDU 100 of an embodiment that includes various features of the present disclosure. The PDU 100 includes a PDU housing 102 and a power input 104 that penetrates the housing 102 and may be connected to an external power source. The PDU 100 according to this embodiment includes housing 102 that is vertically mountable in an equipment rack, although it will be understood that other form factors may be used, such as a horizontally mountable housing. A plurality of outlet modules 106 may be located within the housing 102 and are accessible through apertures 108 in a front face 110 of the housing 102. The outlet modules 106 will be described in more detail below. The PDU 100 of FIG. 1 can include a number of circuit breakers 112 that provide over-current protection for one or more associated outlet modules 106. The PDU 100 can also include a communications module 114 that may be coupleable with one or more of a local computer, local computer network, and/or remote computer network. A display portion 116 may be used to provide a local display of information related to current operating parameters of the PDU 100, such as the quantity of current being provided through the input and/or one or more of the outlets, or the power or energy consumed by one or more outlets of the PDU, to name a few. Although the embodiment of FIG. 1 depicts outlet modules having 14 outlets, other embodiments can include outlet modules with more or fewer outlets.

Figure 2:
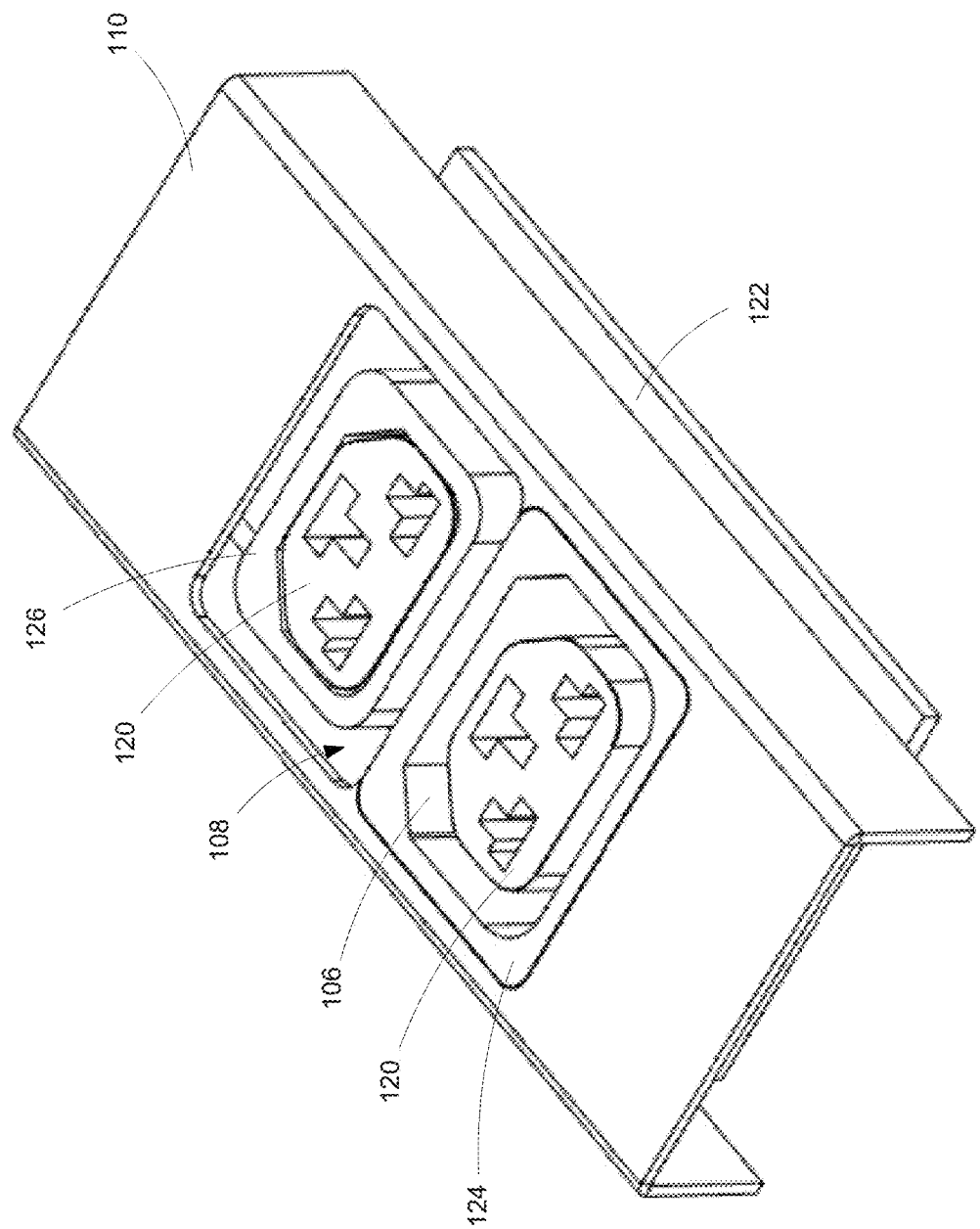
FIG. 2 is an isometric view of a combination outlet connector module according to a representative embodiment.
Figure 3A:
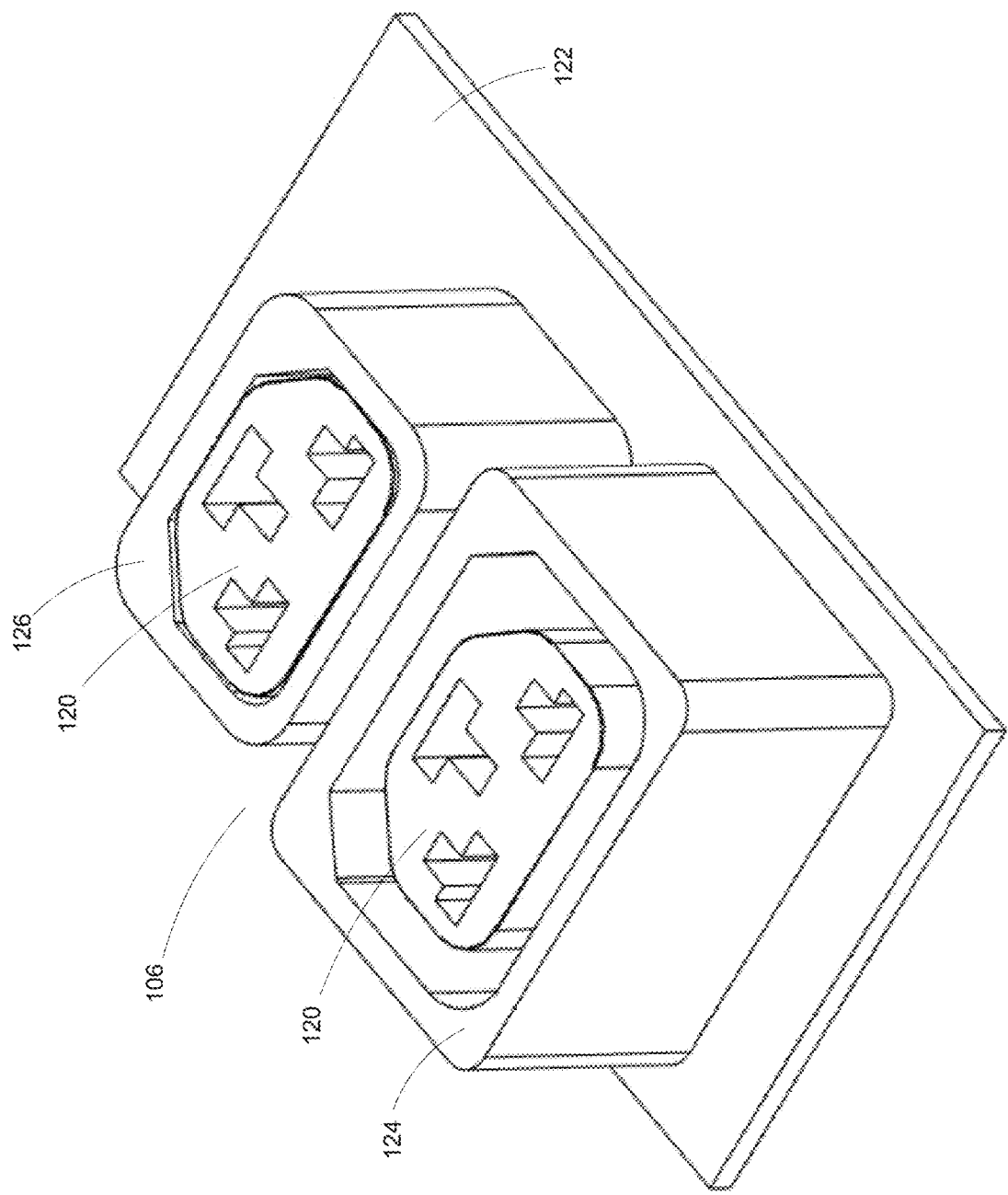
FIG. 3A is an isometric view of the combination outlet connector module shown in FIG. 2 with the front face removed for clarity.

FIGS. 2 and 3A illustrate a combination outlet module 106 having two combination outlet cores 120 mounted on the surface of a mounting board, such as a printed circuit board 122. As explained more fully below, the outlet cores 120 incorporate slots and electrical contacts for a first connector type (e.g., standard C13/C14) as well as a second connector type (e.g., standard C19/C20). In other words, the outlet core has the envelope of a C13 outlet, but can accept both C14 and C20 plugs. The standard connector types referred to herein (e.g., C13, C14, C19, and C20) all refer to industry standard connectors defined in International Electro technical Commission (IEC) standard publication IEC60320 as of the filing date of the present application.

Figure 3B:
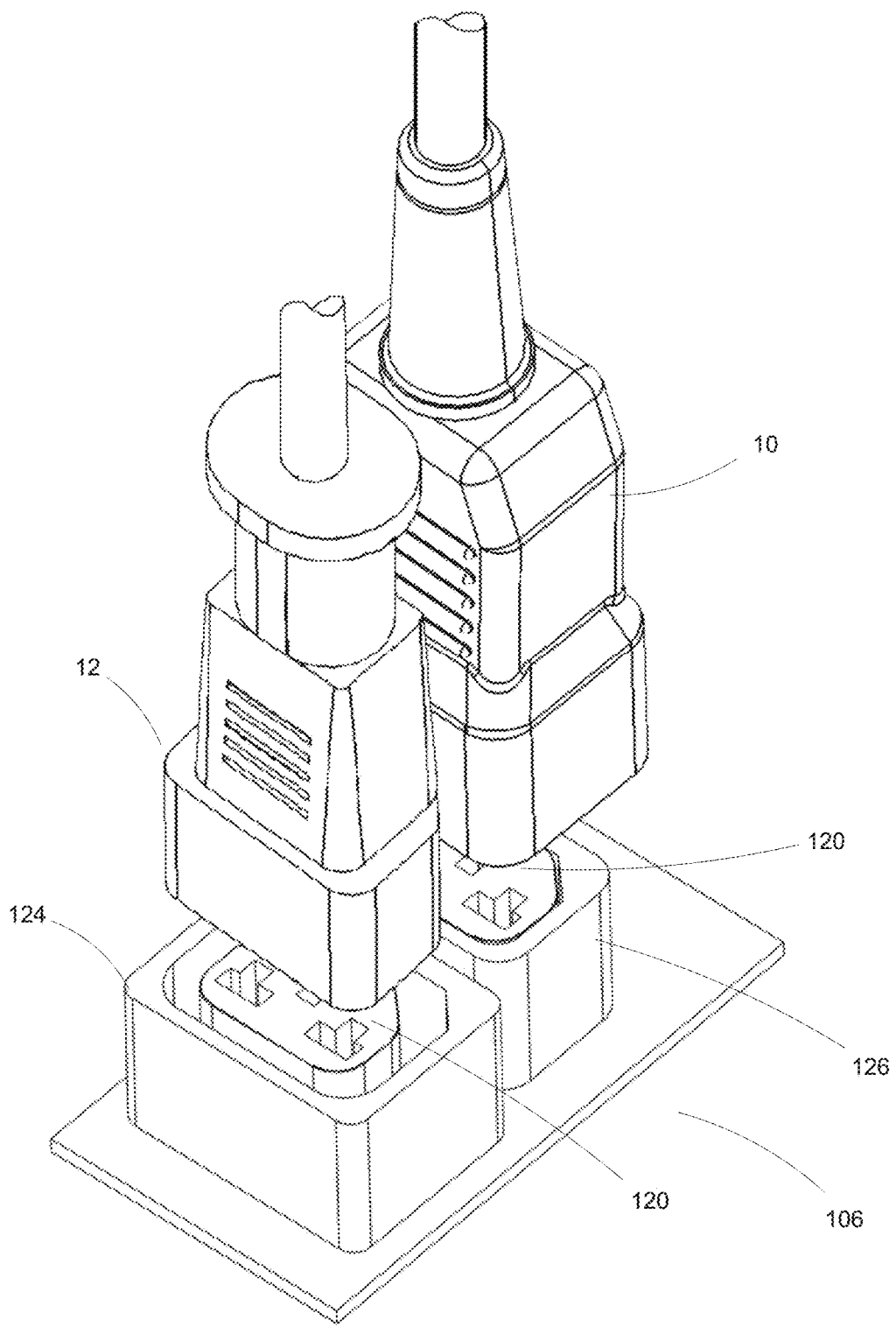
FIG. 3B is an isometric view of the combination outlet connector module shown in FIG. 3A with mating plugs.
Figure 3C:
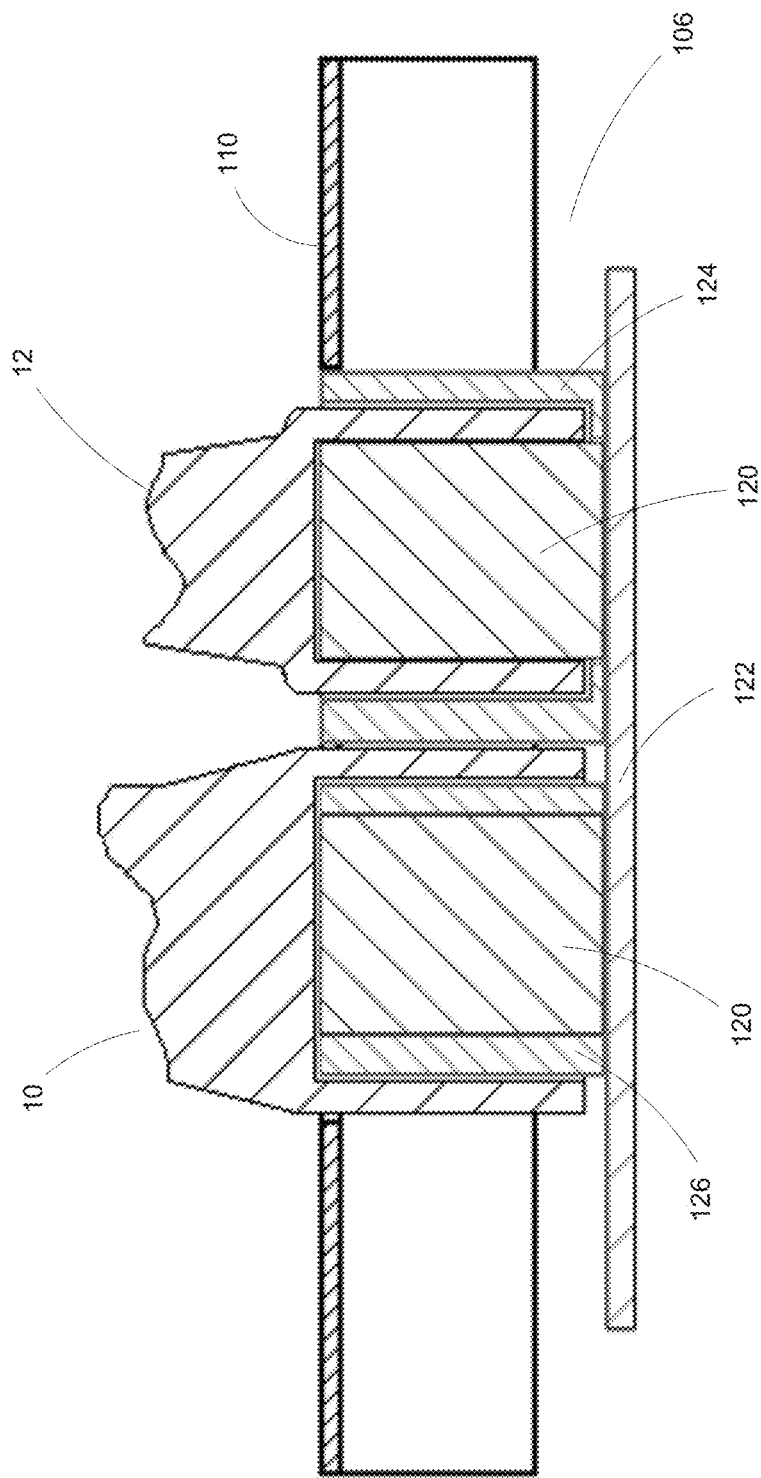
FIG. 3C is cross-section of the combination outlet connector module shown in FIG. 2 with representative mating plugs connected thereto.

With further reference to FIGS. 3B and 3C, in some embodiments, the outlet module 106 can include a removable outlet shroud 124. The outlet shroud 124 can be positioned around a corresponding combination outlet core 120 in order to prevent a C20 plug 10 from being connected to the outlet core 120 and to provide for proper mating of the C14 plug 12 to the outlet core 120. The term "shroud" as used herein refers to a sleeve like structure that is spaced apart from the outlet core 120, leaving a gap between the core 120 and the shroud 124 to receive the first connector type. In some embodiments, the outlet module 106 can include a removable adapter sleeve 126 positioned around the outlet core 120 in order to prevent a C14 plug 12 from being connected to the outlet core 120 and to provide a core shape corresponding to a C20 plug 10 in order to provide for proper mating of the C20 plug 10 to the outlet core 120.

Although the embodiments are shown and described with respect to C13/C14 and C19/C20 connectors, other connector combinations could be used. Other suitable connector types might include, for example and without limitation, industry standard connectors, such as IEC C2, C4, C6, C8, C10, C12, C16, C16A, C18, C22, C24 or NEMA 5-10R, 5-15R, 5-20R, 6-20R, 6-30R, 6-50R, L15-20R, L15-30R, L21-20R, L21-30R. In various embodiments, the connectors could include connectors defined in the IEC standard as of the filing date of the present application.

Figure 5:
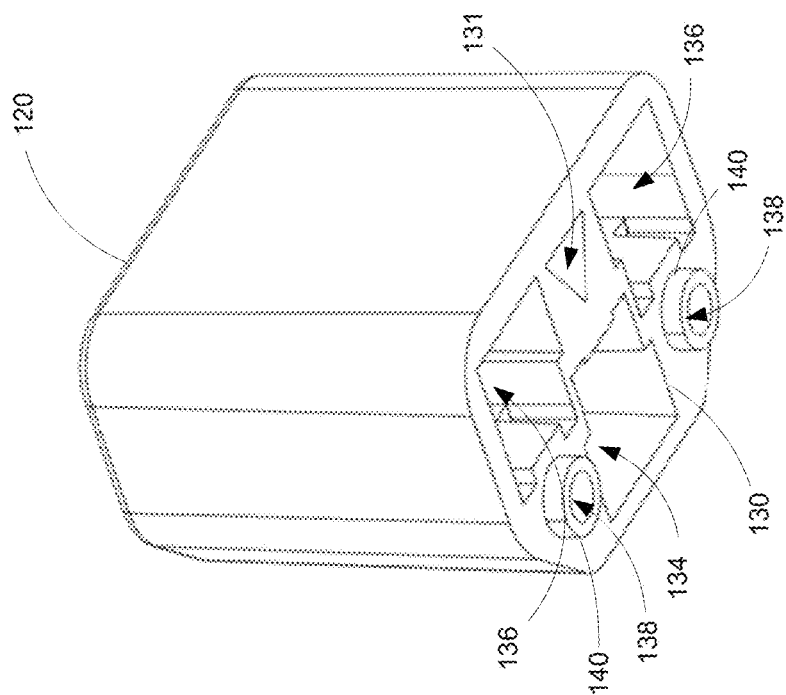
FIG. 5 is an isometric view of the combination outlet core shown in FIG. 4 as viewed from an input side.
Figure 4:
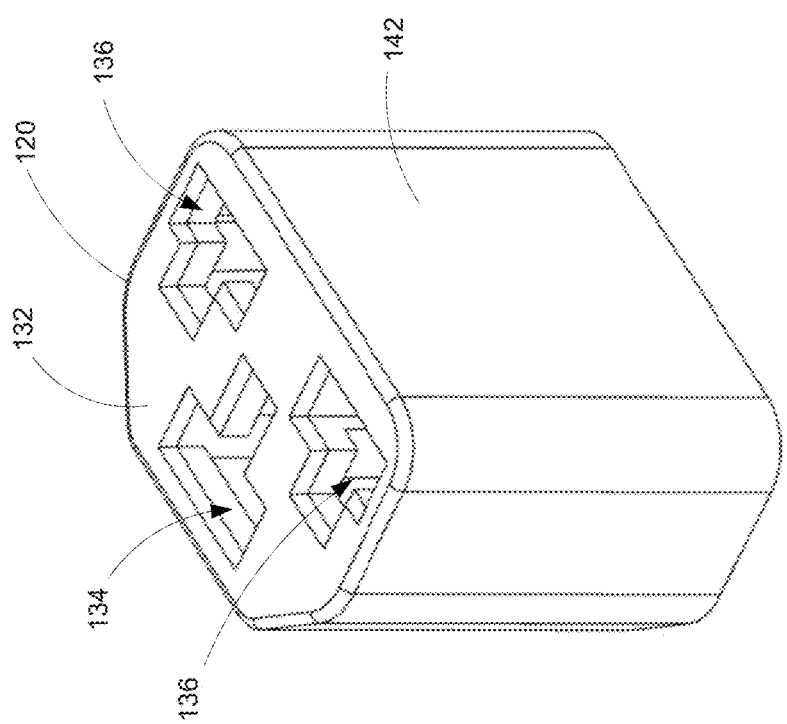
FIG. 4 is an isometric view of a combination outlet core according to a representative embodiment as viewed from an output side.

As shown in FIGS. 4 and 5, the combination outlet core 120 has an input side 130 and an output side 132 with three apertures 134/136 extending therebetween. The outlet core 120 has a core outer surface 142 configured to mate with a first connector type. For example, in the depicted embodiment the core outer surface 142 is configured as a C13 outlet to mate with a C14 plug. The apertures 134/136 are each configured to receive mating terminals corresponding to both the first connector type (e.g., C14) and the second connector type (e.g., C20). In this embodiment, the apertures 134/136 comprise intersecting cross-wise slots or T-shaped apertures as shown in FIG. 4, for example. Accordingly, the apertures 134/136 can accept the terminals of a C20 plug and the perpendicularly oriented terminals of a C14 plug. In some embodiments, the combination outlet core 120 can comprise injection molded plastic, for example. In some embodiments, the combination outlet core 120 can include one or more cavities 131 for reducing the amount of material needed to mold the core.

Apertures 136 are aligned with respect to each other and aperture 134 is oriented opposite to and between the apertures 136, as shown. With specific reference to FIG. 5, the input side 130 of the combination outlet core 120 can include a pair of bosses 140 and corresponding mounting holes 138. The bosses 140 can be used to locate the combination outlet core 120 on the printed circuit board 122 (FIG. 3A). Suitable fasteners (not shown) can be threaded into the mounting holes 138 in order to attach the outlet core 120 to the printed circuit board 122 (FIG. 3A). Other mounting arrangements are possible. For example, the outlet core 120 can be adhered to the printed circuit board 122 with a suitable adhesive. In still other embodiments, the outlet core 120 can be captured on the circuit board 122 by electrical terminals which can be soldered to the circuit board.

Figure 7:
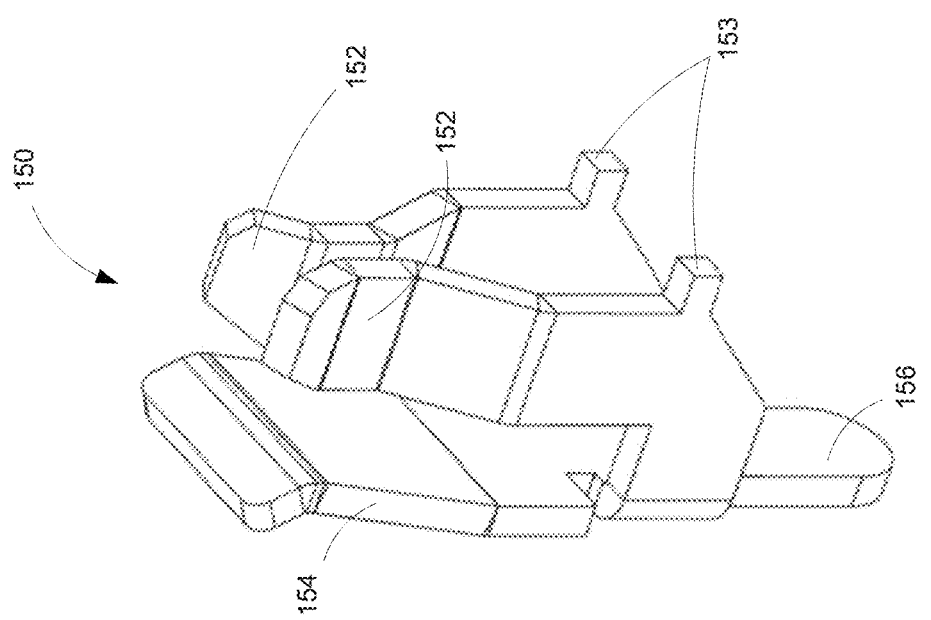
FIG. 7 is an isometric view of a representative terminal.

With reference to FIGS. 6A and 6B, a plurality of electrical terminals 150 are each positioned in a corresponding one of the apertures 134/136. Each aperture 134/136 includes corresponding flanges 144 and 146 to define the aperture opening. Each aperture 134/136 also includes a pair of notches 133 to properly position the terminals 150 in their respective apertures. With further reference to FIG. 7, each electrical terminal 150 can include a connection tab 156, a pair of opposed prongs 152, and a transverse prong 154. Each of the opposed prongs 152 includes a locating pin 153 configured to mate with the notches 133 (FIG. 6A). The opposed prongs 152 are configured to connect with a mating terminal of a first connector type (e.g., C14) by receiving the mating terminal therebetween. The mating terminal of a second connector type (e.g., C20) can be received between the pair of opposed prongs 152 on one side and the transverse prong 154 on the opposite side. In some embodiments, the terminals 150 can be integrally formed from a single piece of conductive material. In some embodiments, electrical terminals 150 can be constructed from suitable electrically conductive materials such as tin, gold, silver, copper, phosphor bronze, and the like. Multiple materials can be used in combination. In one embodiment, the terminals can comprise copper alloy with a tin plating.

In some embodiments, the terminals can comprise multiple pieces or parts. For example, the electrical terminals 174, shown in FIGS. 8A and 8B, each comprise first and second terminal parts 176 and 178, respectively. The first terminal part 176 can include a connection tab 180 and a pair of opposed prongs 182. The opposed prongs 182 are configured to connect with a mating terminal of a first connector type (e.g., C14) by receiving the mating terminal therebetween.

The second terminal part 178 also includes a connection tab 184 and a pair of opposed prongs 186. The mating terminal of a second connector type (e.g., C20) can be received between the pair of opposed prongs 186. In some embodiments, a notch 188 is formed in one of the pair of opposed prongs 186. The notch 188 provides clearance for the mating terminal of the first connector type. The first and second terminal parts, 176 and 178, are maintained in position relative to each other in an orthogonal orientation by virtue of being connected (e.g., soldered) to a circuit board 190 (FIG. 8A). In some embodiments, each of the first and second terminal parts 176 and 178 can be integrally formed from a single piece of conductive material.

As shown in FIG. 9A, the removable shroud 124 is configured to be positioned around a corresponding outlet core 120 (FIG. 6B) and includes a shroud inner surface 160 configured to receive the first connector type (e.g., C14). The removable shroud 124 also includes a shroud outer surface 162 that can be at least partially congruent with the apertures 108 in the front face 110 of the PDU housing (FIG. 2). In some embodiments, the shroud 124 includes a shroud flange 164 having a shroud aperture 166 at least partially congruent with the core outer surface 142 (FIG. 4), which centers the shroud 124 around the combination outlet core 120. In some embodiments, the shroud aperture 166 is sized to provide a friction fit against the core outer surface 120, thereby retaining the shroud 124 on the core 120.

FIGS. 9B and 9C illustrate a removable shroud 234 including a mounting flange 261 and locking tabs 263. The removable shroud 234 is configured to be positioned around a corresponding outlet core 120 (FIG. 6B) and includes a shroud inner surface 260 configured to receive the first connector type (e.g., C14). The removable shroud 234 also includes a shroud outer surface 262 that can be at least partially congruent with the apertures 108 in the front face 110 of the PDU housing (FIG. 2). The mounting flange 261 rests against the front face 110 and grooves 267, formed in the locking tabs 263, engage the PDU housing 102, thereby releasably locking the shroud 234 to the housing 102 (FIG. 1). The locking tabs 263 can include lead-in surfaces 269 to facilitate installing the shroud 234 into the housing 102. The locking tabs 263 can also include gripping features, such as grooves 271, to facilitate squeezing the tabs together for removal of the shroud 234. In some embodiments, the locking tabs 263 can include latch grooves 265 to engage with a mated first connector type. In some embodiments, the shroud 234 includes a shroud flange 264 having a shroud aperture 266 at least partially congruent with the core outer surface 142 (FIG. 4). In some embodiments, the shroud aperture 266 includes bumps 267 to center the shroud aperture 266 on the outlet core 120 (FIG. 6B).

Figure 10B:
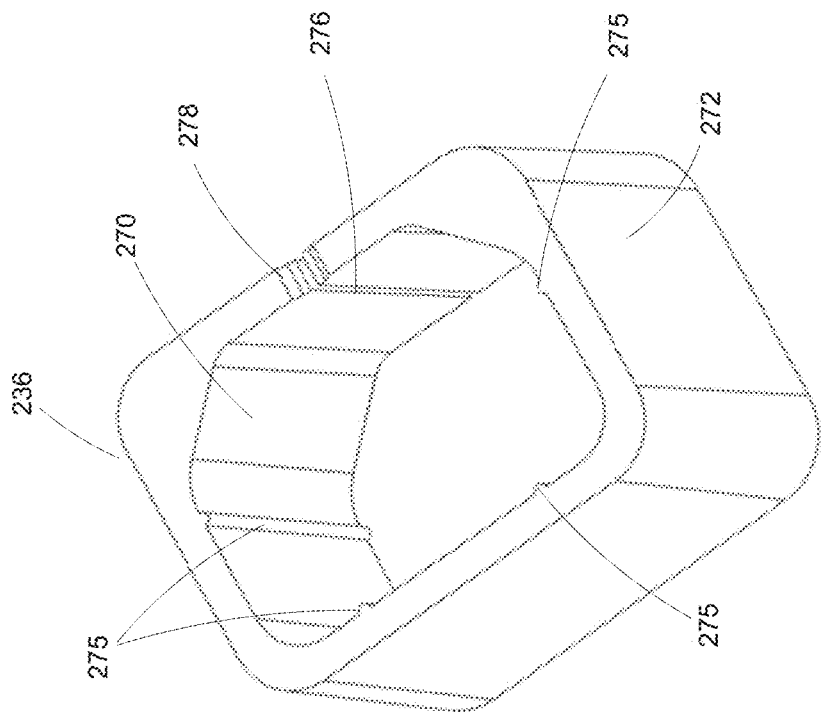
FIG. 10B is an isometric view of an outlet adapter sleeve according to another representative embodiment.
Figure 10A:
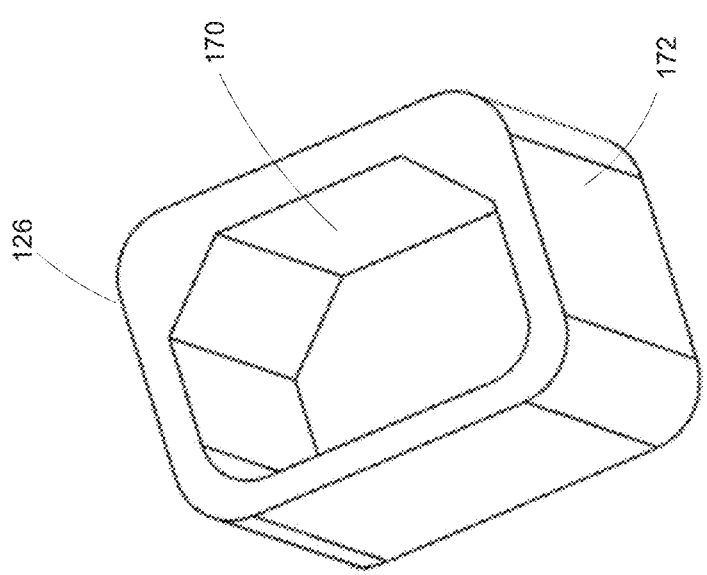
FIG. 10A is an isometric view of an outlet adapter sleeve according to a representative embodiment.

As shown in FIG. 10A, the adapter sleeve 126 is configured to be positioned around a corresponding outlet core 120 (FIG. 6B) and includes a sleeve outer surface 172 configured to mate with the second connector type (e.g., C20). In some embodiments, the adapter sleeve 126 includes a sleeve aperture 170 at least partially congruent with the core outer surface 142 (FIG. 4). In some embodiments, the sleeve aperture 170 is sized to provide a friction fit against the core outer surface 120, thereby retaining the sleeve 126 on the core 120. In other embodiments, the shroud 124 and the sleeve 126 can be retained on the core 120 with magnets, snaps, latches, and/or tabs, to name a few. By using the disclosed combination outlets 120 along with various combinations of the outlet shrouds 124 and the adapter sleeves 126, a PDU can be adapted for different initial applications as well as changing requirements resulting from equipment changes.

As shown in FIG. 10B, the adapter sleeve 236 is configured to be positioned around a corresponding outlet core 120 (FIG. 6B) and includes a sleeve outer surface 272 configured to mate with the second connector type (e.g., C20). In some embodiments, the adapter sleeve 236 includes a sleeve aperture 270 at least partially congruent with the core outer surface 142 (FIG. 4). In some embodiments, the aperture 270 includes ribs 275 positioned around the opening to center the sleeve 236 on the core 120. In some embodiments, the sleeve aperture 270 is sized such that the ribs 275 provide a friction fit against the core outer surface 120, thereby retaining the sleeve 236 on the core 120. The sleeve 236 can include a slot 276 that can be expanded with a tool (e.g., a screwdriver) to facilitate installation and removal of the sleeve 236. In some embodiments, the slot 276 can include lead-in chamfers 278 to guide the tool to the slot 276.

FIGS. 11A and 11B illustrate an outlet shroud assembly 200 that locks onto a C14 plug according to a representative embodiment. The locking outlet shroud assembly 200 includes a shroud 202 and a lock frame 204. The shroud 202 is configured to be positioned around a corresponding outlet core 120 (e.g., FIG. 6B) and includes corner flanges 212 which define a shroud inner surface 214 configured to receive the first connector type (e.g., C14). The shroud 202 includes a shroud outer surface 203 that can be at least partially congruent with the aperture 108 in the front face 110 of the PDU housing (FIG. 2). In some embodiments, retainer tabs 210 are formed in the surface 203 of the shroud 202 to engage an underside of the front face 110, thereby retaining the shroud assembly 200 in the aperture 108.

The lock frame 204 includes first and second end walls 222 and 224, respectively. A pair of sidewalls 228 connect the first and second end walls 222 and 224 together. The sidewalls 228 are captured in a pair of corresponding channels 212 formed in the shroud 202. The lock frame sidewalls 228 are slideable in the channels 212 such that the lock frame 204 can be moved between a connector locked position (e.g., FIGS. 11A and 11B) and a connector release position. The first end wall 222 includes a locking barb 220 configured to capture a corresponding feature on a mating plug, such as a C14 plug 12 shown in FIG. 3B. The shroud 202 includes an upwardly projecting support arm 206 and a resilient member, such as a spring 208. In the depicted embodiment, the shroud 202, support arm 206, and spring 208 can be an integrally molded component. The spring 208 is positioned to push against the first end wall 222 thereby urging the lock frame 204 toward the connector locked position. The lock frame 204 is moved to the connector release position by squeezing the second end wall 224 and the support arm 206 together, thereby moving the locking barb 220 away from the shroud inner surface 214. In some embodiments, the second end wall 224 and the support arm 206 can include grip features 226 and 216, respectively.

Figure 12:
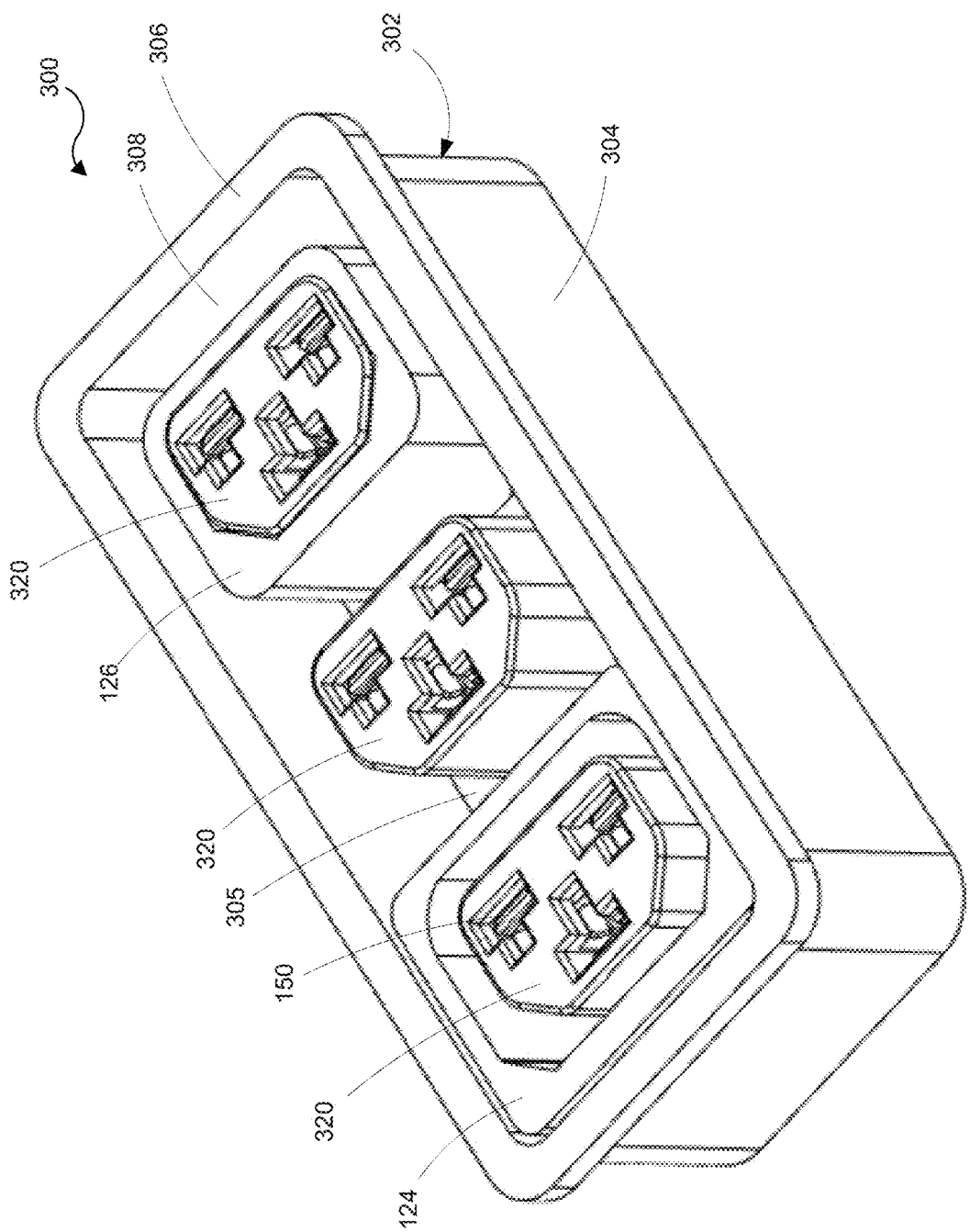
FIG. 12 is an isometric view of a combination outlet connector bank according to a representative embodiment.
Figure 13:
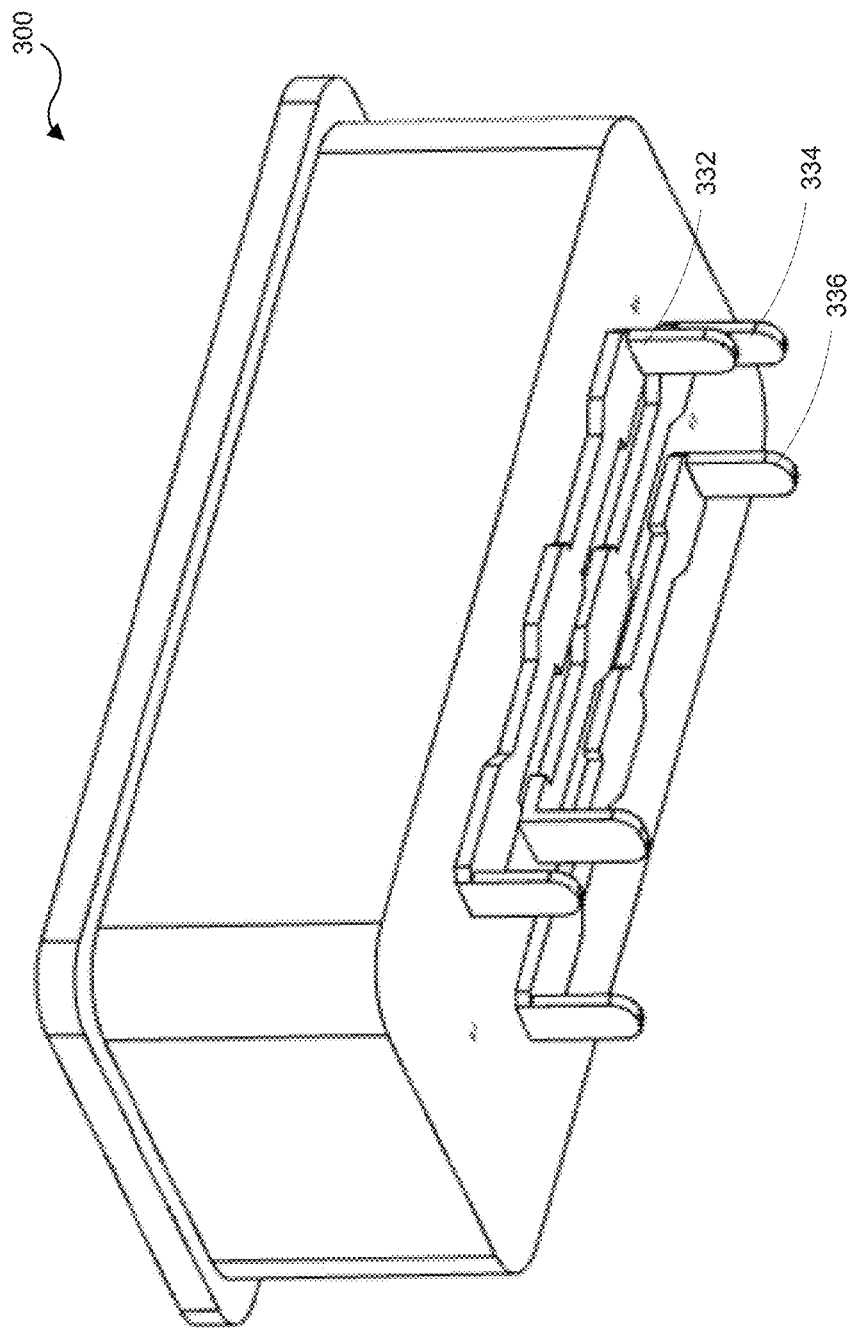
FIG. 13 is an isometric view of the combination outlet connector bank shown in FIG. 12 as viewed from underneath.

A combination outlet connector bank 300, as shown in FIG. 12, includes a unitary body 302 having a surrounding sidewall 304 with a flange 306 extending therefrom. The unitary body 302 includes a plurality of combination outlet cores 320. The combination outlet connector bank 300 includes a recessed surface 305 which is part of the unitary body 302 from which the plurality of outlet cores 320 extend toward the surrounding flange 306. In some embodiments, the unitary body 302 can comprise injection molded plastic, for example. As with the combination outlet connectors described above, the combination outlet cores 320 incorporate T-shaped apertures and corresponding electrical contacts 150 to connect with a first connector type (e.g., standard C13/C14) as well as a second connector type (e.g., standard C19/C20). In some embodiments, the combination outlet connector bank 300 can include one or more outlet shrouds 124. The outlet shroud 124 can be positioned around a corresponding combination outlet core 320 in order to prevent a C20 plug from being connected to the outlet core 320. The shroud's outer surface can be at least partially congruent with an inner surface 308 of the unitary body 302, as shown. In some embodiments, the combination outlet connector bank 300 can include one or more adapter sleeves 126 positioned around a corresponding outlet core 320 in order to prevent a C14 plug from being connected to the outlet core 320 and to provide a core shape corresponding to a C20 plug to properly align and capture the plug on the core. In some embodiments, the shroud 124 and sleeve 126 can be integrally molded in the unitary body 302. As shown in FIG. 13, the terminals can be ganged together via circuit rails 332, 334, and 336. In some embodiments, only some of the terminals are ganged together and in other embodiments all of the terminals may be left unganged.

Figure 14:
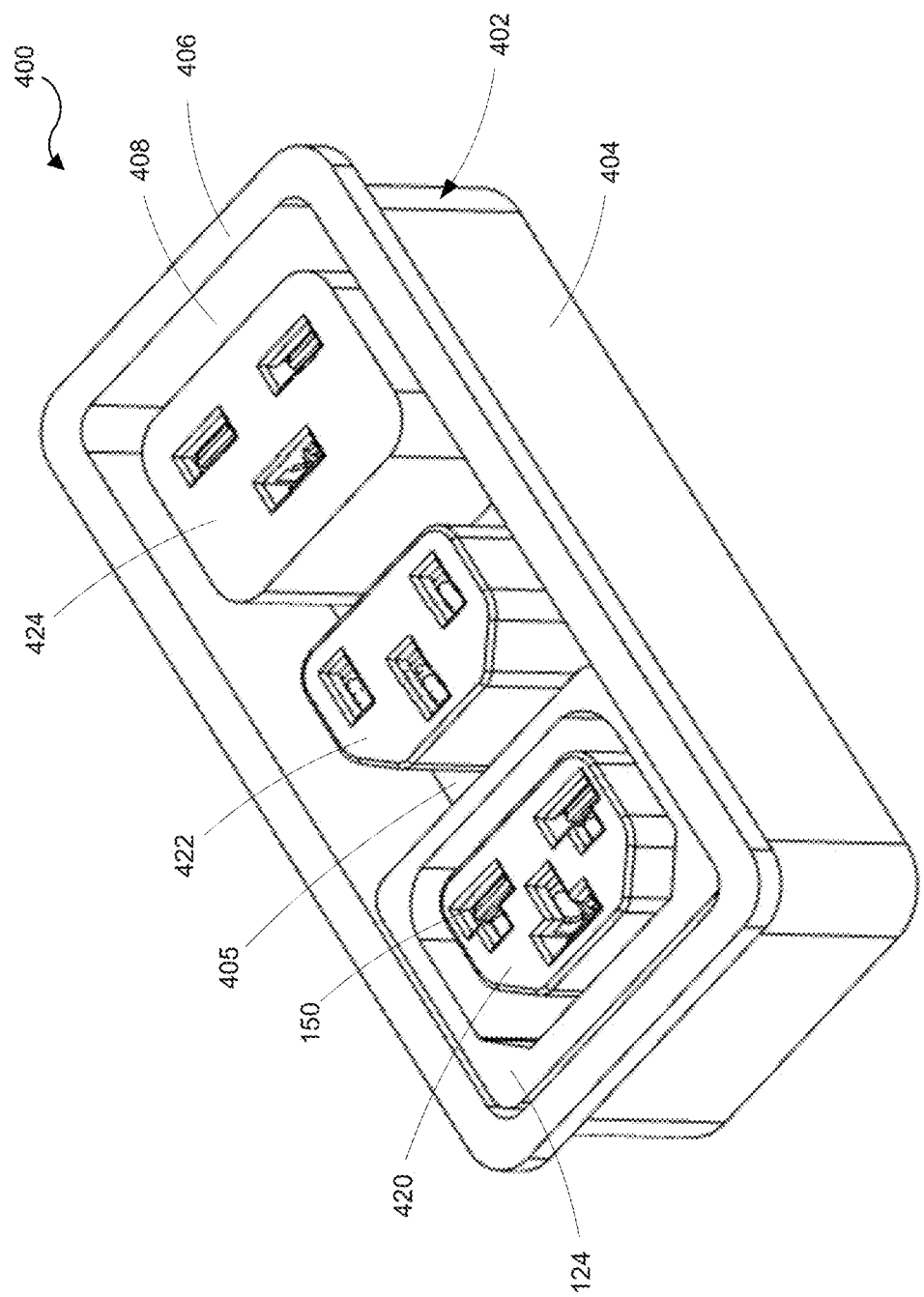
FIG. 14 is an isometric view of a combination outlet connector bank according to a further representative embodiment.

FIG. 14 illustrates a combination outlet connector bank 400 according to another representative embodiment. The combination outlet connector bank 400 includes a unitary body 402 having a surrounding sidewall 404 with a flange 406 extending therefrom. The unitary body 402 includes at least one combination outlet core 420 and at least one of a C13 outlet core 422 and a C19 outlet core 424. The combination outlet connector bank 400 includes a recessed surface 405 which is part of the unitary body 402 from which the outlet cores (420, 422, 424) extend toward the surrounding flange 406. In some embodiments, the unitary body 402 can comprise injection molded plastic, for example. As with the combination outlet connectors described above, the combination outlet core 420 incorporates T-shaped apertures and corresponding electrical contacts 150 to connect with a first connector type (e.g., standard C13/C14) as well as a second connector type (e.g., standard C19/C20). In some embodiments, the combination outlet connector bank 400 can include one or more outlet shrouds 124. The outlet shroud 124 can be positioned around the corresponding combination outlet core 420 in order to prevent a C20 plug from being connected to the outlet core 420. The shroud's outer surface can be at least partially congruent with an inner surface 408 of the unitary body 402, as shown. In some embodiments, the combination outlet connector bank 400 can include one or more adapter sleeves 126 (FIG. 3A) positionable around a corresponding outlet core 420 in order to prevent a C14 plug from being connected to the outlet core 420 and to provide a core shape corresponding to a C20 plug to properly align and capture the plug on the core.

In some embodiments, the outlet shrouds and adapter sleeves can include one or more magnets, the presence or absence of which can be used to determine whether a shroud or a sleeve is present on a particular combination outlet core. For example, the outlet shroud can include a single magnet and the adapter sleeve can include two magnets to indicate, to a suitable processing system, that an outlet shroud or an adapter sleeve is present, respectively. In some embodiments, the magnets can be cylindrical magnets comprising a suitable magnetic material such as neodymium, for example. The outlet module's printed circuit board can include one or more hall effect sensors to detect which if any magnets are present, by sensing the magnetic field generated by the installed magnets. Thus, the presence or absence of a shroud or sleeve can be determined based on which hall effect sensors detect a magnet affixed to the shroud or sleeve. A similar identification system is further described in U.S. Pat. No. 10,236,648 (89344-8047.US01), filed Apr. 25, 2017, entitled POWER DISTRIBUTION UNIT SYSTEM INCORPORATING SMART CABLES AND ADAPTERS, the disclosure of which is hereby incorporated by reference in its entirety. Other sensors can be used such as electrical contacts, optical sensors, and electro-mechanical switches, to name a few.

Figure 15:
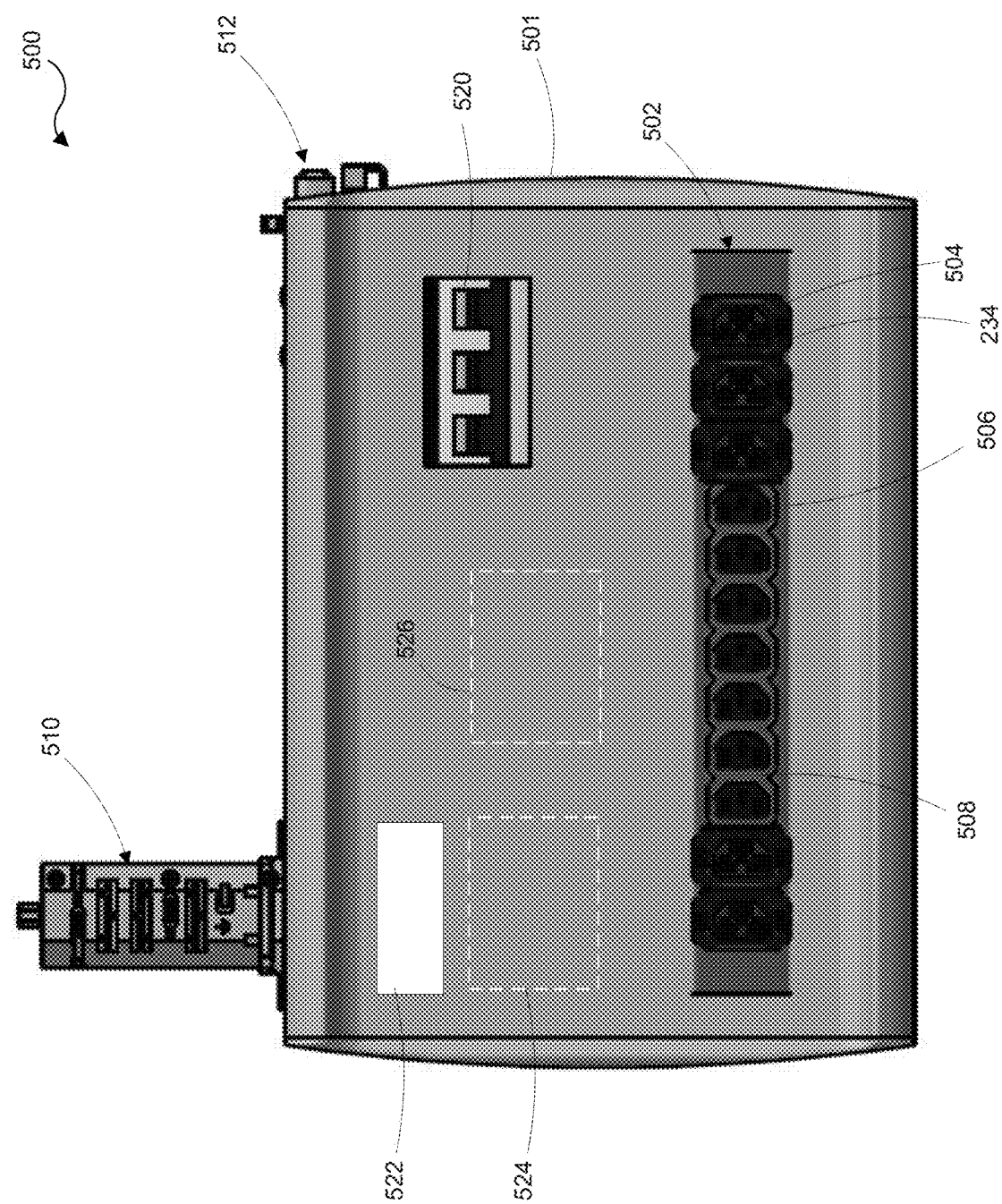
FIG. 15 is a front view of a track busway power distribution unit according to a representative embodiment.

As shown in FIG. 15, other PDU housing form factors are suitable for use with the disclosed technology. For example, track busway PDU 500 (also referred to as a plug in unit and a tap off box) includes a horizontally oriented housing 501 with an outlet connector bank 502. Outlet connector bank 502 can include multiple combination outlets 504, such as described above, along with multiple conventional C13 outlets 506. In some embodiments, other types of outlets can be included in the connector bank 502, such as C19 outlets.

The above described shrouds and sleeves can also be included with the outlet connector bank 502. For example, shroud 234, described above with respect to FIGS. 9B and 9C, can be included with the combination outlets 504. In some embodiments, power cords (not shown) can extend from the housing 501. As shown in FIG. 15, the outlet connector bank 502 can include unobstructed spaces between adjacent outlets, such as the unobstructed space 508 between adjacent outlets 506. This arrangement allows the outlets to be placed closer together (higher density), thereby reducing the length of the PDU as explained more fully in U.S. Pat. No. 9,614,335 (89344-8034.US02), filed Apr. 9, 2015, entitled HIGH OUTLET DENSITY POWER DISTRIBUTION UNIT, the disclosure of which is hereby incorporated by reference in its entirety. In some embodiments, non-standard outlet cores providing even higher outlet densities can be used, such as those described in U.S. Pat. No. 9,583,902 (89344-8034.US03), filed Apr. 15, 2015, entitled HIGH OUTLET DENSITY POWER DISTRIBUTION UNIT, the disclosure of which is hereby incorporated by reference in its entirety. In some embodiments, the PDU can include locking outlet modules such as those described in commonly owned U.S. patent application Ser. No. 16/819,568 (89344-8052.US00), filed Mar. 16, 2020, entitled LOCKING COMBINATION OUTLET MODULE AND POWER DISTRIBUTION UNIT INCORPORATING THE SAME, the disclosure of which is hereby incorporated by reference in its entirety.

The PDU 500 can include, for example, circuit breakers 520, a display 522, communication circuitry 524, and switching and monitoring circuitry 526, all as described in one or more of the following patents all of which are incorporated herein by reference in their entireties: U.S. Pat. No. 7,043,543 (89344-8005.US00), entitled VERTICAL-MOUNT ELECTRICAL POWER DISTRIBUTION PLUG-STRIP, issued on May 9, 2006; U.S. Pat. No. 7,990,689 (89344-8019.US09), entitled POWER DISTRIBUTION UNIT AND METHODS OF MAKING AND USE INCLUDING MODULAR CONSTRUCTION AND ASSEMBLIES, issued on Aug. 2, 2011; U.S. Pat. No. 8,494,661 (89344-8025.US04), entitled POWER DISTRIBUTION, MANAGEMENT, AND MONITORING SYSTEMS, and issued on Jul. 23, 2013; U.S. Pat. No. 8,321,163 (89344-8026.US01), entitled MONITORING POWER-RELATED PARAMETERS IN A POWER DISTRIBUTION UNIT, and issued on Nov. 27, 2012; U.S. Pat. No. 8,587,950 (89344-8029.US00), entitled METHOD AND APPARATUS FOR MULTIPLE INPUT POWER DISTRIBUTION TO ADJACENT OUTPUTS, and issued on Nov. 19, 2013; and U.S. Pat. No. 9,898,026 (89344-8027.US02), entitled POWER DISTRIBUTION APPARATUS WITH INPUT AND OUTPUT POWER SENSING AND METHOD OF USE, and issued on Feb. 20, 2018. In some embodiments, the PDU can include a breaker for the unit and/or breakers for each outlet. In some embodiments, the network communication circuitry 524 can include wireless communication capabilities, such as Bluetooth or WiFi. The switching and monitoring circuitry 526 can include current and/or voltage monitoring for the power input and each outlet.

Figure 16:
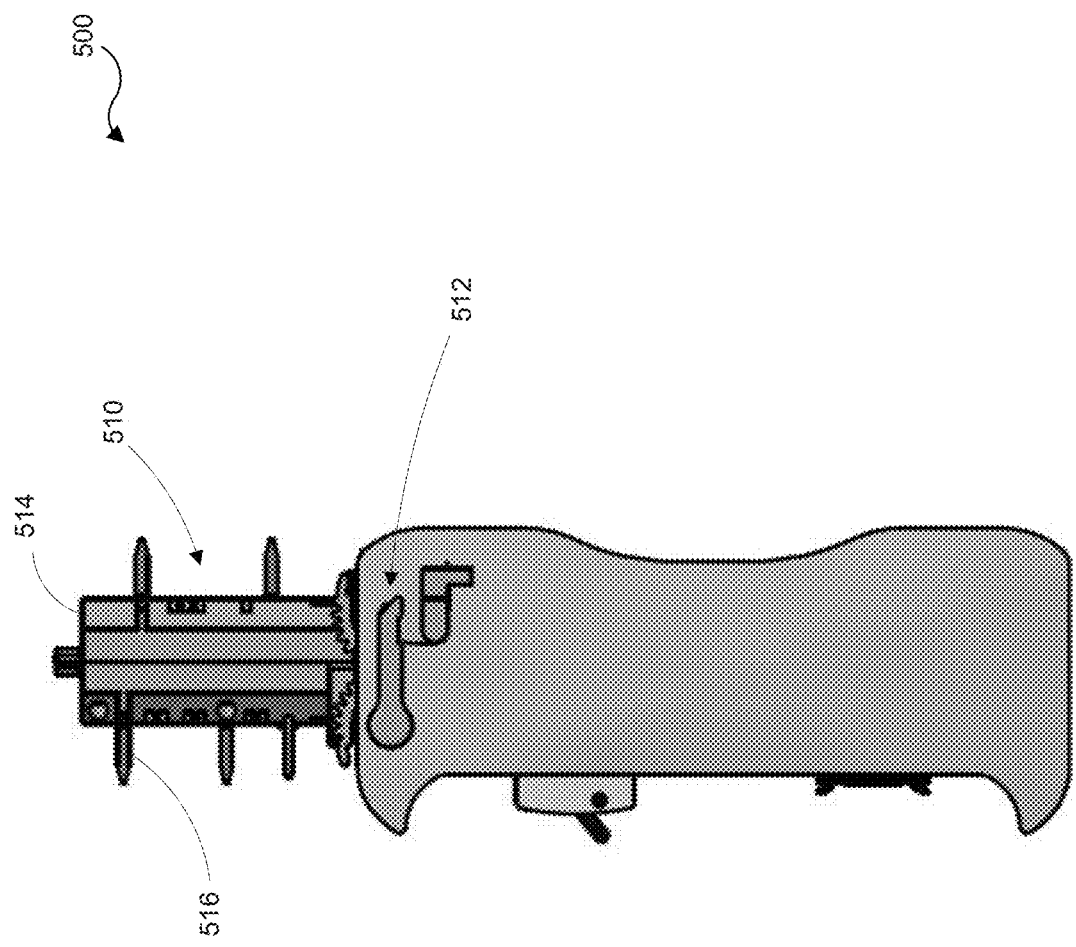
FIG. 16 is a side view of the track busway power distribution unit shown in FIG. 15.

The track busway PDU 500 can include a power input connector 510 and a securement mechanism 512 for attaching the PDU to a busway. With further reference to FIG. 16, the power input connector 510 is configured to removably engage an electrical busway (not shown) by inserting the power input connector 510 into the busway and turning it 90 degrees. The power input connector 510 can comprise a tap member 514 carrying multiple stabs or blades 516 that contact corresponding busbars within the busway. Once the power input assembly 510 is engaged with the busway, the securement mechanism 512 can be manually actuated to engage the busway housing and secure the PDU 500 in position along the busway. Suitable busways, power input connectors, and securement mechanisms are described more fully in U.S. Pat. No. 9,379,502, filed Feb. 13, 2015, entitled TOOL-LESS BUSWAY TAKE-OFF DEVICE FOR ELECTRICAL BUSWAY AND METHOD OF INSTALLING, the disclosure of which is hereby incorporated by reference in its entirety.

Figure 17B:
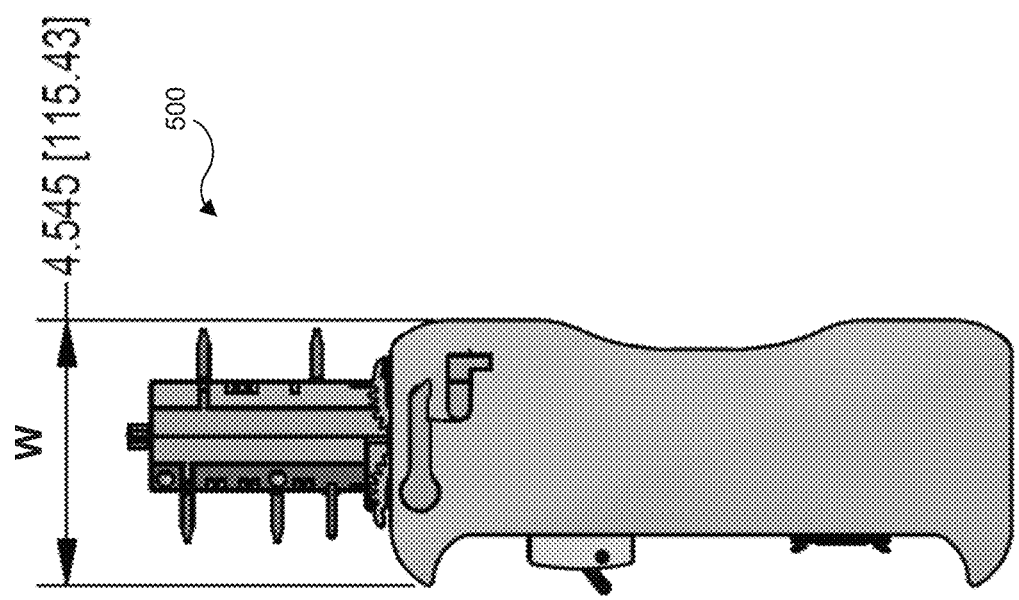
FIGS. 17A and 17B are front and side views, respectively, of a track busway power distribution unit illustrating representative dimensions of the unit according to a representative embodiment.
Figure 17A:
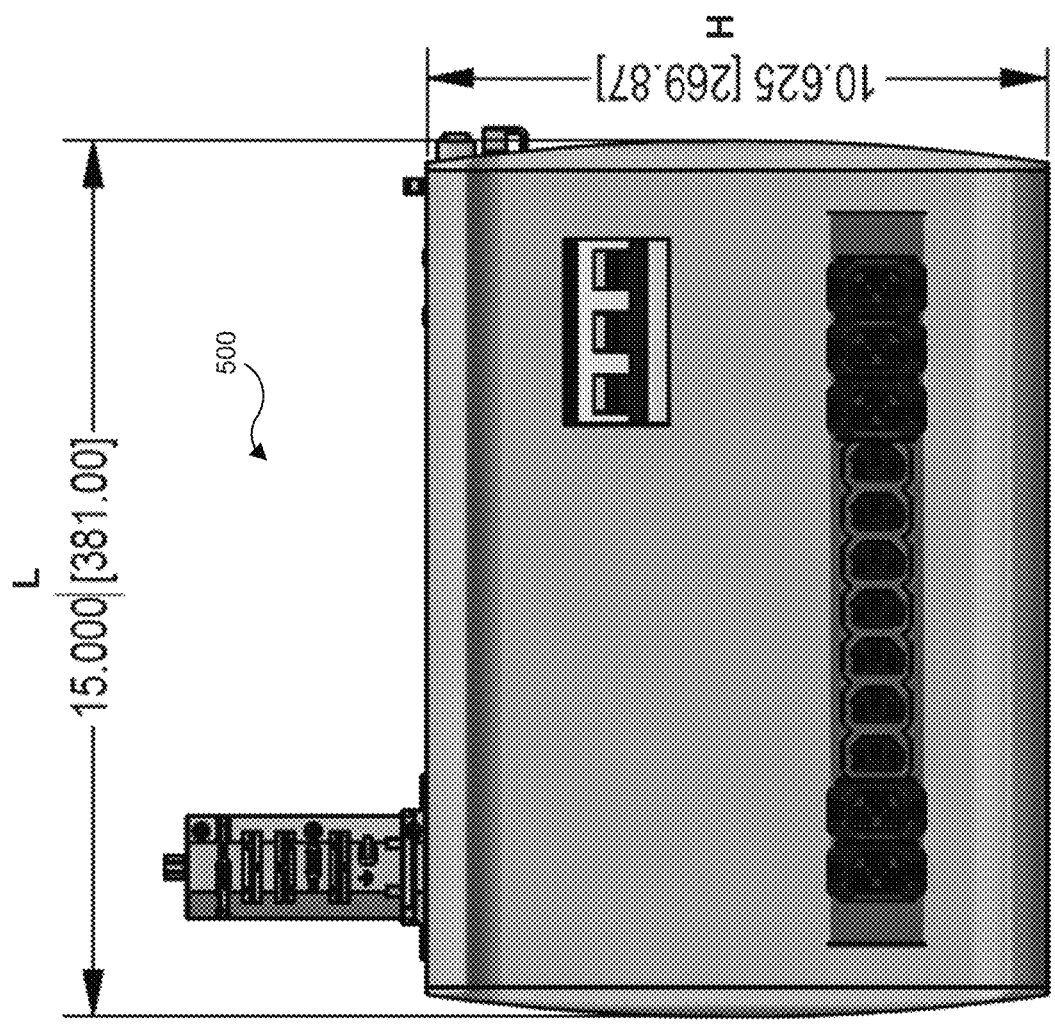

FIGS. 17A and 17B illustrate representative dimensions of the PDU 500 according to a representative embodiment. For example, the PDU can have a length (L), height (H), and width (W) of 15 inches, 10.625 inches, and 4.545 inches, respectively. In some embodiments, the length (L) can be increased or decreased to accommodate more or fewer outlets.

Figures 18A, 18B:
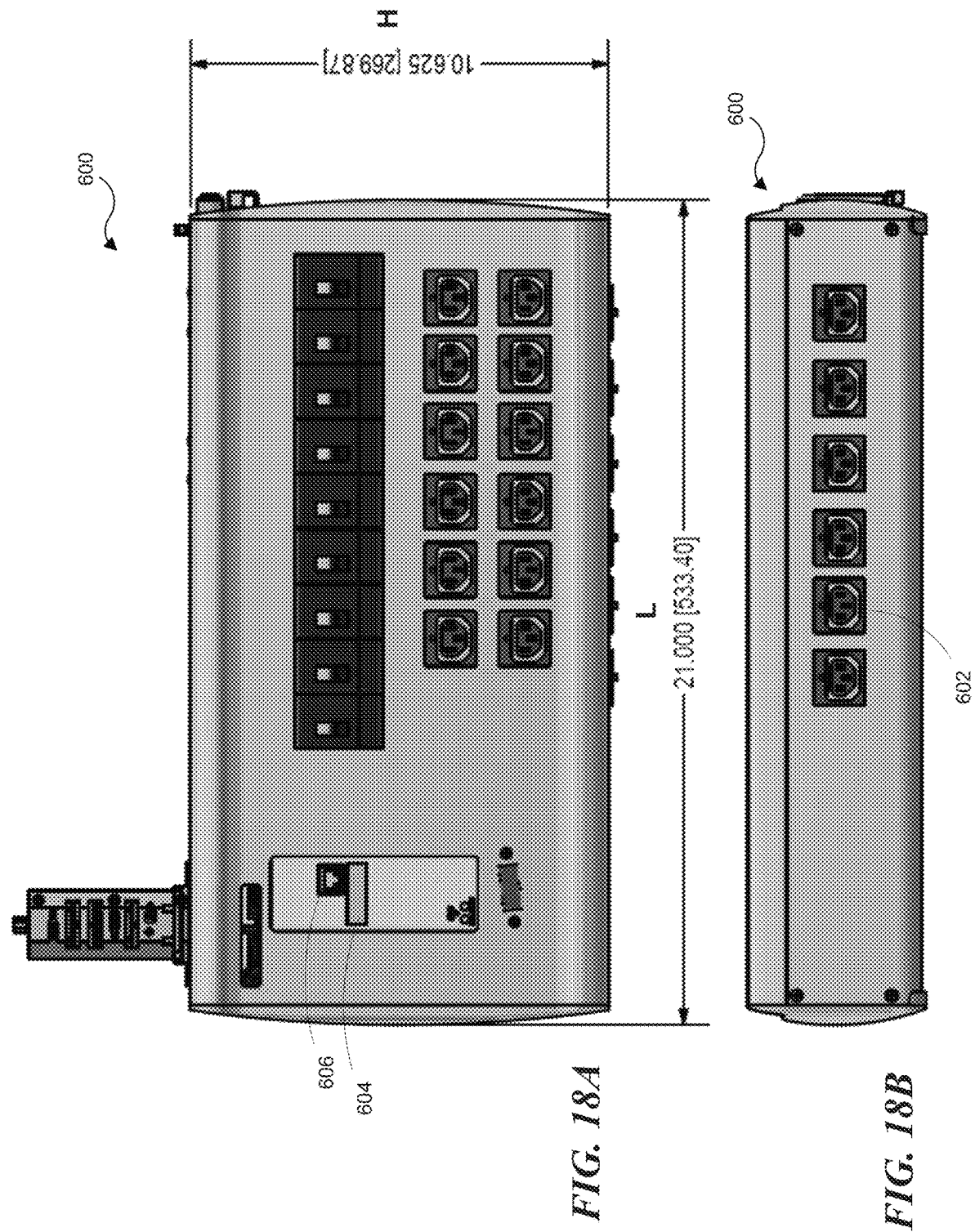
FIGS. 18A and 18B are front and side views, respectively, of a track busway power distribution unit according to another representative embodiment.

FIGS. 18A and 18B illustrate a track busway PDU 600 according to another embodiment of the disclosed technology. PDU 600 is similar to PDU 500 except that it includes conventional C13 outlets 602, including six outlets positioned on the bottom of the housing. PDU 600 is also larger in length (L) at 21 inches long. PDU 600 can include a display 604 and a network connector 606. As with PDU 500, PDU 600 can include circuit breakers, communication circuitry, and switching and monitoring circuitry.

It should be noted that the systems and devices discussed above are intended merely to be examples. It must be stressed that various embodiments may omit, substitute, or add various procedures or components as appropriate. For instance, it should be appreciated that, in alternative embodiments, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention. It will be noted that various advantages described herein are not exhaustive or exclusive, and numerous different advantages and efficiencies may be achieved, as will be recognized by one of skill in the art.

Specific details are given in the description to provide a thorough understanding of the embodiments. However, it will be understood by one of ordinary skill in the art that the embodiments may be practiced without these specific details. For example, well-known circuits, structures, and techniques have been shown without unnecessary detail in order to avoid obscuring the embodiments.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

We claim:

1. A track busway power distribution unit, comprising:
   a housing;
   a power input coupled with the housing and connectable to an external electrical busway;
   a securement mechanism moveably coupled to the housing and structured to removably engage and secure the power distribution unit to the external electrical busway; and
   at least one outlet module located at least partially within the housing and including:
      at least one outlet core having a core outer surface configured to mate within a first connector type;
      wherein said at least one outlet core includes a plurality of electrical terminals each coupled to the power input and configured to connect with mating terminals corresponding to both the first connector type and a second connector type that is different than the first connector type; and
      a removable shroud positioned around said at least one outlet core, wherein the shroud includes a shroud inner surface configured to receive the first connector type.

2. The track busway power distribution unit of claim 1, wherein the first connector type is an IEC C14 connector and the second connector type is an IEC C20 connector.

3. The track busway power distribution unit of claim 1, wherein said at least one outlet core includes a plurality of apertures each configured to receive mating terminals corresponding to both the first connector type and the second connector type.

4. The track busway power distribution unit of claim 3, wherein the plurality of apertures each have a T-shaped configuration.

5. The track busway power distribution unit of claim 1, wherein the power input includes a tap member with multiple stabs extending laterally therefrom.

6. The track busway power distribution unit of claim 1, wherein the at least one outlet core includes a first outlet core and a second outlet core, each of the first outlet core and the second outlet core including the plurality of electrical terminals configured to connect with mating terminals corresponding to both the first connector type and the second connector type, the first outlet core having its core outer surface configured to mate with the first connector type with the removable shroud positioned around the first outlet core, the shroud inner surface of the removable shroud configured to receive the first connector type and prevent mating with the second connector type, the core outer surface of the first outlet core being a first core outer surface, the second outlet core having a second core outer surface able to accommodate the second connector type.

7. The track busway power distribution unit of claim 6, wherein the second outlet core includes an adapter sleeve positioned around the second outer core surface to allow for mating with the second connector type and prevent mating with the first connector type.

8. The track busway power distribution unit of claim 7, wherein each of the first outlet core and the second outlet core have an inlet side and an output side with a plurality of apertures extending therebetween, the first core outer surface extending between the inlet side and the output side of the first outlet core and the second core outer surface extending between the inlet side and the output side of the second outlet core.

9. The track busway power distribution unit of claim 8, wherein the plurality of apertures at the output side of the first outlet core are configured to receive mating terminals corresponding to both the first connector type and the second connector type, and wherein the plurality of apertures at the output side of the second outlet core are configured to receive mating terminals corresponding to both the first connector type and the second connector type.

10. A track busway power distribution unit, comprising:
a housing;
a power input coupled with the housing and connectable to an external electrical busway;
a securement mechanism moveably coupled to the housing and structured to removably engage and secure the power distribution unit to the external electrical busway; and
at least one outlet module located at least partially within the housing, said at least one outlet module including a plurality of outlet cores, there being an unobstructed space between at least two adjacent outlet cores, each outlet core having an inlet side and an output side, with a plurality of apertures extending therebetween, and a core outer surface extending between the inlet side and the output side, the core outer surface being configured to mate with one of a first connector type and a second connector type different than the first connector type, and wherein the plurality of apertures at the output side are configured to receive mating terminals corresponding to both the first connector type and the second connector type.

11. The track busway power distribution unit of claim 10, wherein each of the outlet cores includes a plurality of electrical terminals each coupled to the power input and configured to connect with mating terminals corresponding to both the first connector type and the second connector type.

12. The track busway power distribution unit of claim 11, wherein said core outer surface of at least one of the plurality of outlet cores includes a removable shroud positioned around said at least one of the plurality of outlet cores, wherein the shroud includes a shroud inner surface configured to receive the first connector type and prevent receipt of the second connector type.

13. The track busway power distribution unit of claim 12, wherein the shroud inner surface is spaced from the core outer surface of said at least one of the plurality of outlet cores to define a gap therebetween for receipt of the first connector type.

14. The track busway power distribution unit of claim 13, wherein the first connector type is an IEC C14 connector and the second connector type is an IEC C20 connector.

15. The track busway power distribution unit of claim 10, wherein said core outer surface of at least one of the plurality of outlet cores includes a removable shroud positioned around said core outer surface to allow for mating with the first connector type and prevent mating with the second connector type.

16. The track busway power distribution unit of claim 15, wherein the first connector type is an IEC C14 connector.

17. The track busway power distribution unit of claim 16, wherein said core outer surface of at least one of the plurality of outlet cores includes an adapter sleeve positioned around said core outer surface to allow for mating with the second connector type and prevent mating with the first connector type.

18. The track busway power distribution unit of claim 17, wherein the second connector type is an IEC C20 connector.

19. The track busway power distribution unit of claim 10, wherein at least one of the plurality of outlet cores includes a removable shroud positioned around its respective core outer surface to allow for mating with the first connector type and prevent mating with the second connector type.

20. The track busway power distribution unit of claim 19, wherein the first connector type is an IEC C14 connector.

* * * * *